United States Patent
Campbell et al.

(10) Patent No.: US 9,064,053 B2
(45) Date of Patent: Jun. 23, 2015

(54) INTEGRATING DIAGNOSTIC INFORMATION WITH BOOLEAN CONSTRAINTS

(71) Applicant: The MathWorks, Inc., Natick, MA (US)

(72) Inventors: Andrew T. Campbell, Medway, MA (US); David M. Saxe, Stow, MA (US); Gregory V. Aloe, Jamaica Plain, MA (US); Gerhard P. Stoeckel, Natick, MA (US)

(73) Assignee: The MathWorks, Inc., Natick, MA (US)

( * ) Notice: Subject to any disclaimer, the term of this patent is extended or adjusted under 35 U.S.C. 154(b) by 282 days.

(21) Appl. No.: 13/705,643

(22) Filed: Dec. 5, 2012

(65) Prior Publication Data

US 2014/0157236 A1 Jun. 5, 2014

(51) Int. Cl.
*G06F 9/44* (2006.01)
*G06F 11/36* (2006.01)

(52) U.S. Cl.
CPC .................................. *G06F 11/3684* (2013.01)

(58) Field of Classification Search
None
See application file for complete search history.

(56) References Cited

U.S. PATENT DOCUMENTS

| | | | |
|---|---|---|---|
| 6,427,228 B1 * | 7/2002 | Wigger | 717/111 |
| 7,107,553 B2 * | 9/2006 | Lockyear et al. | 716/106 |
| 7,634,756 B2 * | 12/2009 | Bjornson et al. | 717/107 |
| 7,885,792 B2 * | 2/2011 | Devane | 703/2 |
| 8,234,647 B1 * | 7/2012 | Chutinan et al. | 718/102 |
| 8,566,375 B1 * | 10/2013 | Kerr-Delworth et al. | 708/200 |
| 8,621,425 B1 * | 12/2013 | Johnson | 717/106 |
| 8,732,685 B2 * | 5/2014 | Moler | 717/149 |
| 8,868,977 B2 * | 10/2014 | Birnbaum et al. | 714/32 |
| 2002/0124239 A1 * | 9/2002 | Nelson | 717/140 |
| 2005/0160398 A1 * | 7/2005 | Bjornson et al. | 717/104 |
| 2006/0059473 A1 * | 3/2006 | Moler | 717/149 |
| 2008/0058962 A1 * | 3/2008 | Ward | 700/17 |
| 2008/0313617 A1 * | 12/2008 | Zhu et al. | 717/127 |
| 2009/0044171 A1 * | 2/2009 | Avadhanula | 717/105 |
| 2011/0113285 A1 * | 5/2011 | Dolby et al. | 714/28 |
| 2012/0254827 A1 * | 10/2012 | Conrad et al. | 717/104 |
| 2012/0254830 A1 * | 10/2012 | Conrad et al. | 717/106 |
| 2012/0266130 A1 * | 10/2012 | Kinnucan et al. | 717/105 |
| 2012/0324286 A1 * | 12/2012 | Birnbaum et al. | 714/26 |

\* cited by examiner

*Primary Examiner* — Don Wong
*Assistant Examiner* — Roberto E Luna
(74) *Attorney, Agent, or Firm* — Harrity & Harrity, LLP

(57) ABSTRACT

A device receives code generated via a technical computing environment (TCE), where the code includes one or more values to be tested. The device receives Boolean constraints and diagnostic information, and generates a test based on the Boolean constraints and the diagnostic information. The device performs the test on the one or more values of the code to generate a result, and outputs or stores the result.

24 Claims, 10 Drawing Sheets

INTEGRATING DIAGNOSTIC INFORMATION WITH BOOLEAN CONSTRAINTS

BRIEF DESCRIPTION OF THE DRAWINGS

The accompanying drawings, which are incorporated in and constitute a part of this specification, illustrate one or more implementations and, together with the description, explain these implementations. In the drawings.

DETAILED DESCRIPTION

The following detailed description refers to the accompanying drawings. The same reference numbers in different drawings may identify the same or similar elements.

A technical computing environment (TCE) may provide a computing environment that allows users to perform tasks related to disciplines, such as, but not limited to, mathematics, science, engineering, medicine, business, etc., more efficiently than if the tasks were performed in another type of computing environment, such as an environment that requires the user to develop code in a conventional programming language, such as C++, C, Fortran, Pascal, etc. In one example, a TCE may include a dynamically-typed programming language (e.g., the M language, a MATLAB® language, a MATLAB-compatible language, a MATLAB-like language, etc.) that can be used to express problems and/or solutions in mathematical notations.

Code generated by the TCE may be tested to determine whether the code will function properly (e.g., when executed). In a simple example, the code may be tested to determine whether a value in the code satisfies a constraint (e.g., is equal to a particular number). If the value satisfies the constraint (i.e., passes), diagnostic information may be generated that informs a programmer that the code functions properly. If the value does not satisfy the constraint (i.e., fails), diagnostic information may be generated that informs the programmer that the code does not function properly.

Overview

Systems and/or methods described herein may integrate meaningful diagnostic information with a rich set of Boolean constraints. In one example, the systems and/or methods may generate a qualification application programming interface (API) that provides a set of constraints for determining whether a calculated value, in code, passes tests for ensuring correctness. The constraints may be used to determine whether or not the calculated value satisfies conditions (e.g., is less than a number, is greater than a number, etc.), and to provide meaningful diagnostic information that explains why the calculated value does or does not satisfy the conditions. The systems and/or methods may enable the constraints to be combined using Boolean logic (e.g., "and," "or," "not," etc.) expressions, and may enable the combination of constraints to produce meaningful diagnostic information. The meaningful diagnostic information may include the structure of the Boolean logic expressions, language for when the constraints are satisfied, language for when the constraints are not satisfied (e.g., negated), etc.

Figure 1:
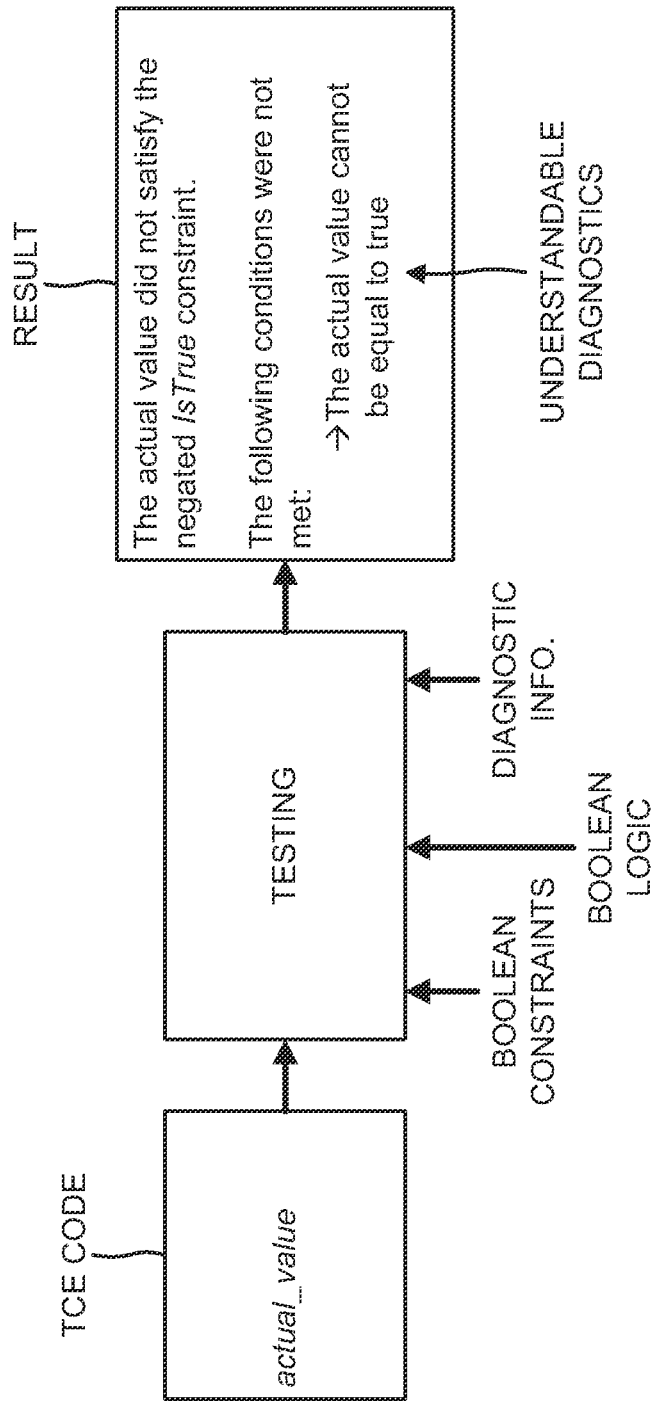
FIG. 1 is a diagram of an overview of an example implementation described herein.

FIG. 1 is a diagram of an overview of an example implementation described herein. As shown in FIG. 1, a computing environment, such as a technical computing environment (TCE), may include a testing component. The testing component may receive code generated by the TCE, and may test the code to determine whether the code will function properly.

As further shown in FIG. 1, the testing component may receive code generated by the TCE. The TCE code may include text-based code that may require further processing to execute, binary code that may be executed, text files that may be executed in conjunction with other executables, etc. In one example, the TCE code may include one or more calculated values (e.g., actual_value) that may need to be tested by the testing component.

The testing component may receive Boolean constraints, Boolean logic, and/or diagnostic information from a person testing (e.g., a tester) the TCE code. Each of the Boolean constraints may include a constraint with two possible outcomes (i.e., true or false). The Boolean logic may include Boolean operators (e.g., "and," "or," "not," etc.) that may enable the Boolean constraints to be combined to form Boolean expressions. The diagnostic information may include information explaining why Boolean constraints and/or Boolean expressions are or are not satisfied.

The testing component may generate a test for the TCE code based on the Boolean constraints, the Boolean logic, and/or the diagnostic information. In one example, the testing component may configure the Boolean constraints with the Boolean logic to generate one or more Boolean expressions. The testing component may combine the diagnostic information with the Boolean expression(s) to create one or more test APIs, and may generate the test based on the test API(s). The testing component may perform the test on the TCE code to generate a result. In one example, the result may include diagnostics that are understandable to the tester, such as the following example diagnostics:

---
The actual value did not satisfy the negated IsTrue constraint.
The following conditions were not met:
→ The actual value cannot be equal to true.

---

The testing component may output (e.g., display to the tester) and/or may store the result.

The terms "code" and "program code," as used herein, are to be used interchangeably and are to be broadly interpreted to include text-based code that may not require further processing to execute (e.g., C++ code, Hardware Description Language (HDL) code, very-high-speed integrated circuits (VHSIC) HDL(VHDL) code, Verilog, Java, and/or other types of hardware or software based code that may be compiled and/or synthesized); binary code that may be executed (e.g., executable files that may directly be executed by an operating system, bitstream files that can be used to configure a field programmable gate array (FPGA), Java byte code, object files combined together with linker directives, source code, makefiles, etc.); text files that may be executed in conjunction with other executables (e.g., Python text files, a collection of dynamic-link library (DLL) files with text-based combining, configuration information that connects pre-compiled modules, an extensible markup language (XML) file describing module linkage, etc.); etc. In one example, code may include different combinations of the above-identified classes (e.g., text-based code, binary code, text files, etc.). Alternatively, or additionally, code may include code generated using a dynamically-typed programming language (e.g., the M language, a MATLAB® language, a MATLAB-compatible language, a MATLAB-like language, etc.) that can be used to express problems and/or solutions in mathematical notations. Alternatively, or additionally, code may be of any type, such as function, script, object, etc., and a portion of code may include one or more characters, lines, etc. of the code.

Example Environment Arrangement

Figure 2:
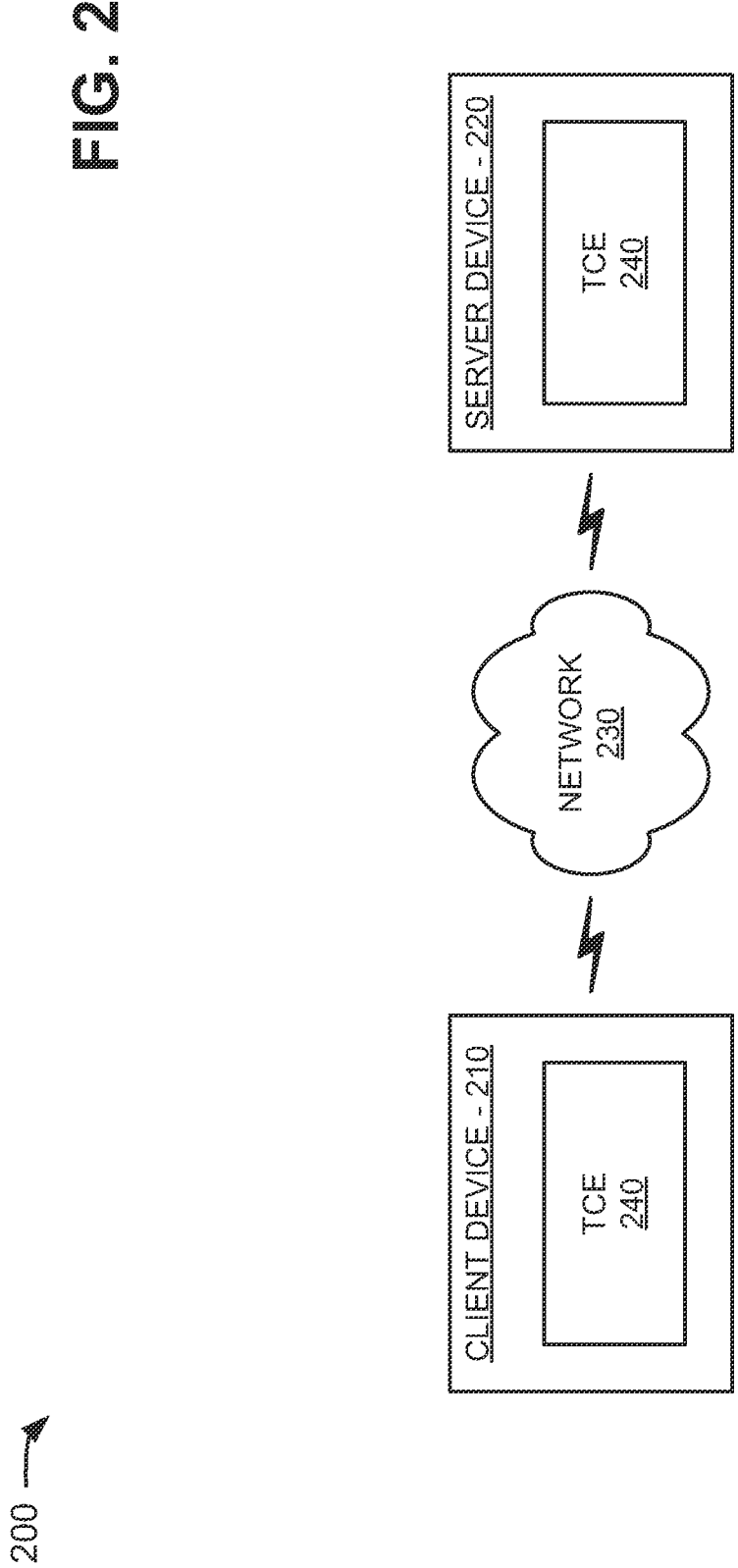
FIG. 2 is a diagram of an example environment in which systems and/or methods described herein may be implemented.

FIG. 2 is a diagram of an example environment 200 in which systems and/or methods described herein may be implemented. As illustrated, environment 200 may include a client device 210 interconnected with a server device 220 via a network 230. Components of environment 200 may interconnect via wired and/or wireless connections. A single client device 210, server device 220, and network 230 have been illustrated in FIG. 2 for simplicity. In practice, environment 200 may include more client devices 210, server devices 220, and/or networks 230. In one example implementation, client device 210 and server device 220 may be provided in a single device or may be provided in separate devices.

Client device 210 may include one or more devices that are capable of communicating with server device 220 via network 230. For example, client device 210 may include a laptop computer, a personal computer, a tablet computer, a desktop computer, a workstation computer, a smart phone, a personal digital assistant (PDA), and/or other computation and communication devices.

Server device 220 may include one or more server devices, or other types of computation and communication devices, that gather, process, and/or provide information in a manner described herein. Server device 220 may include a device that is capable of communicating with client device 210 (e.g., via network 230). In one example, server device 220 may include one or more laptop computers, personal computers, workstation computers, servers, central processing units (CPUs), graphical processing units (GPUs), application-specific integrated circuits (ASICs), field-programmable gate arrays (FPGAs), etc. and/or software (e.g., a simulator) executing on the aforementioned devices. In one example, server device 220 may include TCE 240 and may perform some or all of the functionality described herein for client device 210. Alternatively, server device 220 may be omitted and client device 210 may perform all of the functionality described herein for client device 210.

Network 230 may include a network, such as a local area network (LAN), a wide area network (WAN), a metropolitan area network (MAN), a telephone network, such as the Public Switched Telephone Network (PSTN), an intranet, the Internet, or a combination of networks.

TCE 240 may be provided within a computer-readable medium of client device 210. Alternatively, or additionally, TCE 240 may be provided in another device (e.g., server device 220) that is accessible by client device 210. TCE 240 may include hardware or a combination of hardware and software that provides a computing environment that allows users to perform tasks related to disciplines, such as, but not limited to, mathematics, science, engineering, medicine, business, etc., more efficiently than if the tasks were performed in another type of computing environment, such as an environment that required the user to develop code in a conventional programming language, such as C++, C, Fortran, Pascal, etc. In one implementation, TCE 240 may include a dynamically-typed programming language (e.g., the M language, a MATLAB® language, a MATLAB-compatible language, a MATLAB-like language, etc.) that can be used to express problems and/or solutions in mathematical notations.

For example, TCE 240 may use an array as a basic element, where the array may not require dimensioning. These arrays may be used to support array-based programming where an operation may apply to an entire set of values included in the arrays. Array-based programming may allow array-based operations to be treated as high-level programming that may allow, for example, operations to be performed on entire aggregations of data without having to resort to explicit loops of individual non-array operations. In addition, TCE 240 may be adapted to perform matrix and/or vector formulations that can be used for data analysis, data visualization, application development, simulation, modeling, algorithm development, etc. These matrix and/or vector formulations may be used in many areas, such as statistics, image processing, signal processing, control design, life sciences modeling, discrete event analysis and/or design, state based analysis and/or design, etc.

TCE 240 may further provide mathematical functions and/or graphical tools (e.g., for creating plots, surfaces, images, volumetric representations, etc.). In one implementation, TCE 240 may provide these functions and/or tools using toolboxes (e.g., toolboxes for signal processing, image processing, data plotting, parallel processing, etc.). Alternatively, or additionally, TCE 240 may provide these functions as block sets or in another way, such as via a library, etc.

TCE 240 may be implemented as a text-based environment (e.g., MATLAB software; Octave; Python; Comsol Script; MATRIXx from National Instruments; Mathematica from Wolfram Research, Inc.; Mathcad from Mathsoft Engineering & Education Inc.; Maple from Maplesoft; Extend from Imagine That Inc.; Scilab from The French Institution for Research in Computer Science and Control (INRIA); Virtuoso from Cadence; Modelica or Dymola from Dynasim; etc.); a graphically-based environment (e.g., Simulink® software, Stateflow® software, SimEvents® software, Simscape™ software, etc., by The MathWorks, Inc.; VisSim by Visual Solutions; LabView® by National Instruments; Dymola by Dynasim; SoftWIRE by Measurement Computing; WiT by DALSA Coreco; VEE Pro or SystemVue by Agilent; Vision Program Manager from PPT Vision; Khoros from Khoral Research; Gedae by Gedae, Inc.; Scicos from (INRIA); Virtuoso from Cadence; Rational Rose from IBM; Rhopsody or Tau from Telelogic; Ptolemy from the University of California at Berkeley; aspects of a Unified Modeling Language (UML) or SysML environment; etc.); or another type of environment, such as a hybrid environment that includes one or more of the above-referenced text-based environments and one or more of the above-referenced graphically-based environments.

TCE 240 may include a programming language (e.g., the MATLAB language) that may be used to express problems and/or solutions in mathematical notations. The programming language may be dynamically typed and/or array-based. In a dynamically typed array-based computing language, data may be contained in arrays and data types of the data may be determined (e.g., assigned) at program execution time.

For example, suppose a program, written in a dynamically typed array-based computing language, includes the following statements:

A='hello'
A=int32([1, 2])
A=[1.1, 2.2, 3.3].

Now suppose the program is executed, for example, in a TCE, such as TCE 240. During run-time, when the statement "A='hello'" is executed the data type of variable "A" may be a string data type. Later when the statement "A=int32([1, 2])" is executed the data type of variable "A" may be a 1-by-2 array containing elements whose data type are 32 bit integers. Later, when the statement "A=[1.1, 2.2, 3.3]" is executed, since the language is dynamically typed, the data type of variable "A" may be changed from the above 1-by-2 array to a 1-by-3 array containing elements whose data types are floating point. As can be seen by this example, data in a program written in a dynamically typed array-based computing language may be contained in an array. Moreover, the data type of the data may be determined during execution of the program. Thus, in a dynamically type array-based computing language, data may be represented by arrays and data types of data may be determined at run-time.

TCE 240 may provide mathematical routines and a high-level programming language suitable for non-professional programmers and may provide graphical tools that may be used for creating plots, surfaces, images, volumetric representations, or other representations. TCE 240 may provide these routines and/or tools using toolboxes (e.g., toolboxes for signal processing, image processing, data plotting, parallel processing, etc.). TCE 240 may also provide these routines in other ways, such as, for example, via a library, local or remote database (e.g., a database operating in a computing cloud), remote procedure calls (RPCs), and/or an application programming interface (API). TCE 240 may be configured to improve runtime performance when performing computing operations. For example, TCE 240 may include a just-in-time (JIT) compiler.

Although FIG. 2 shows example components of environment 200, in other implementations, environment 200 may include fewer components, different components, differently arranged components, and/or additional components than those depicted in FIG. 2. Alternatively, or additionally, one or more components of environment 200 may perform one or more other tasks described as being performed by one or more other components of environment 200.

Example Device Architecture

Figure 3:
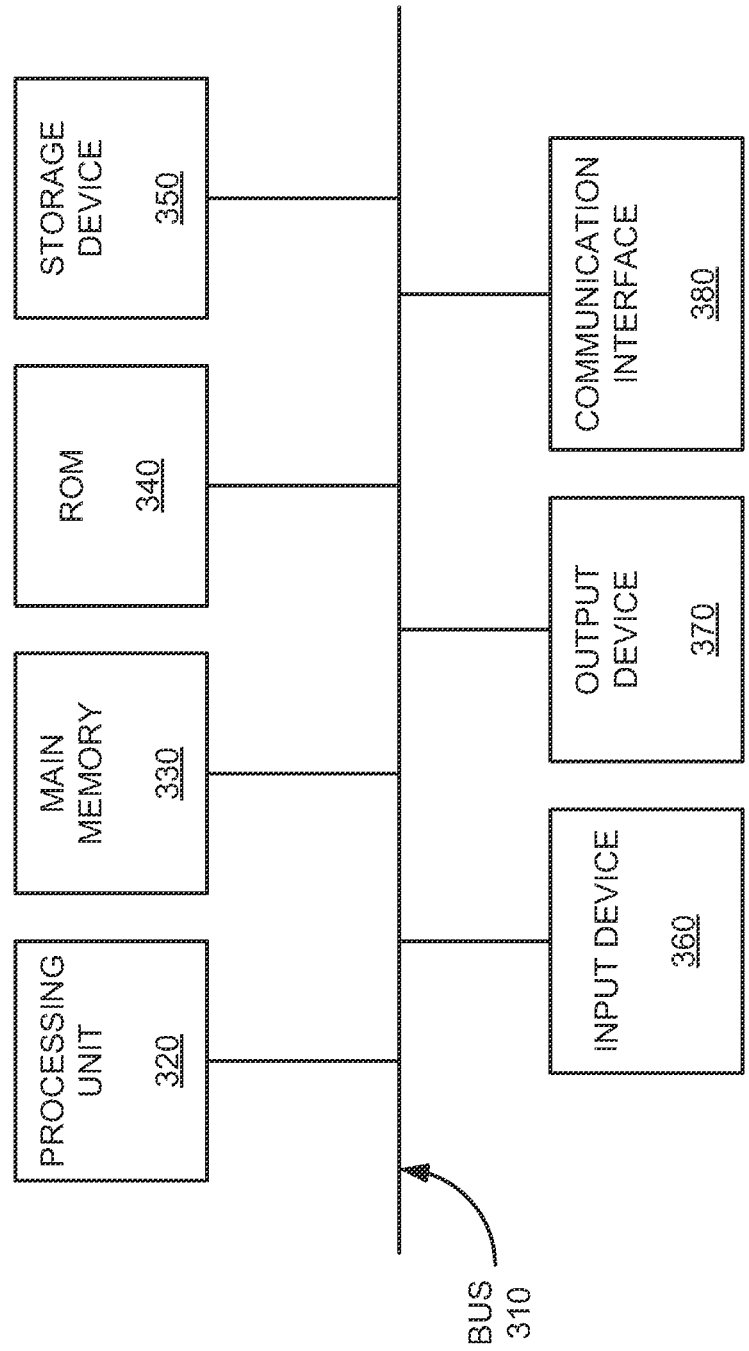
FIG. 3 is a diagram of example components of one or more of the devices of the environment depicted in FIG. 2.

FIG. 3 is an example diagram of a device 300 that may correspond to one or more of the devices of environment 200. As illustrated, device 300 may include a bus 310, a processing unit 320, a main memory 330, a read-only memory (ROM) 340, a storage device 350, an input device 360, an output device 370, and/or a communication interface 380. Bus 310 may include a path that permits communication among the components of device 300.

Processing unit 320 may include one or more processors, microprocessors, or other types of processing units that may interpret and execute instructions. Main memory 330 may include one or more random access memories (RAMs) or other types of dynamic storage devices that may store information and/or instructions for execution by processing unit 320. ROM 340 may include one or more ROM devices or other types of static storage devices that may store static information and/or instructions for use by processing unit 320. Storage device 350 may include a magnetic and/or optical recording medium and its corresponding drive.

Input device 360 may include a mechanism that permits a user to input information to device 300, such as a keyboard, a camera, an accelerometer, a gyroscope, a mouse, a pen, a microphone, voice recognition and/or biometric mechanisms, a remote control, a touch screen, a neural interface, etc. Output device 370 may include a mechanism that outputs information to the user, including a display, a printer, a speaker, etc. Communication interface 380 may include any transceiver-like mechanism that enables device 300 to communicate with other devices, networks, and/or systems. For example, communication interface 380 may include mechanisms for communicating with another device or system via a network.

As described herein, device 300 may perform certain operations in response to processing unit 320 executing software instructions contained in a computer-readable medium, such as main memory 330. A computer-readable medium may be defined as a non-transitory memory device. A memory device may include space within a single physical memory device or spread across multiple physical memory devices. The software instructions may be read into main memory 330 from another computer-readable medium, such as storage device 350, or from another device via communication interface 380. The software instructions contained in main memory 330 may cause processing unit 320 to perform processes described herein. Alternatively, hardwired circuitry may be used in place of or in combination with software instructions to implement processes described herein. Thus, implementations described herein are not limited to any specific combination of hardware circuitry and software.

Although FIG. 3 shows example components of device 300, in other implementations, device 300 may include fewer components, different components, differently arranged components, and/or additional components than depicted in FIG. 3. Alternatively, or additionally, one or more components of device 300 may perform one or more other tasks described as being performed by one or more other components of device 300.

Example Technical Computing Environment

Figure 4:
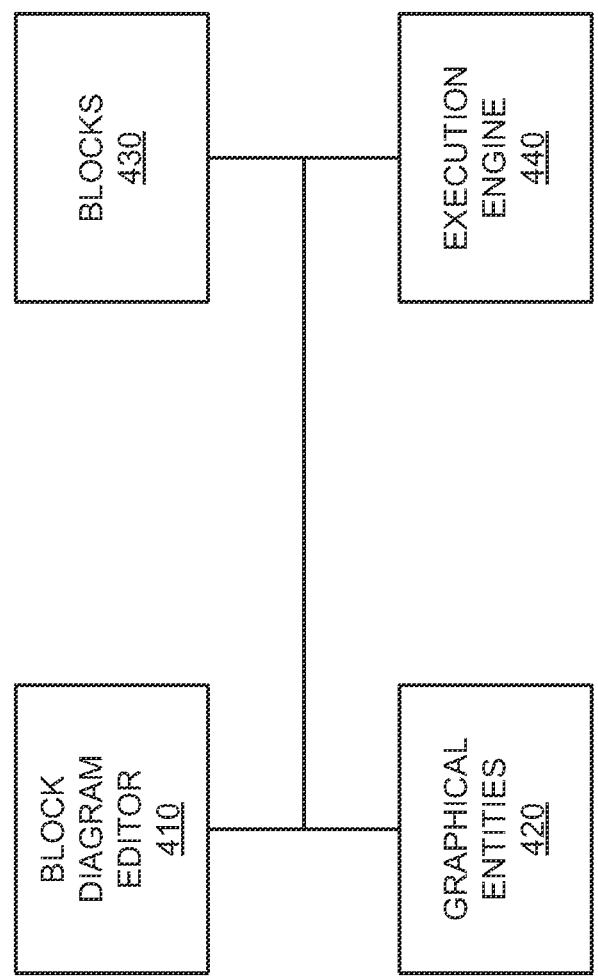
FIG. 4 is a diagram of example functional components of a technical computing environment (TCE) that may be used by one or more of the devices of the environment depicted in FIG. 2.

FIG. 4 is a diagram of example functional components of TCE 240. In one implementation, the functions described in connection with FIG. 4 may be performed by one or more components of device 300 (FIG. 3) and/or by one or more devices 300. As shown in FIG. 4, TCE 240 may include a block diagram editor 410, graphical entities 420, blocks 430, and/or an execution engine 440.

Block diagram editor 410 may include hardware or a combination of hardware and software that may be used to graphically specify models of dynamic systems. In one implementation, block diagram editor 410 may permit a user to perform actions, such as construct, edit, display, annotate, save, and/or print a graphical model (e.g., a block diagram that visually and/or pictorially represents a dynamic system). In another implementation, block diagram editor 410 may permit a user to create and/or store data relating to graphical entities 420.

A textual interface may be provided to permit interaction with block diagram editor 410. A user may write scripts that perform automatic editing operations on a model using the textual interface. For example, the textual interface may provide a set of windows that may act as a canvas for the model, and may permit user interaction with the model. A model may include one or more windows depending on whether the model is partitioned into multiple hierarchical levels.

Graphical entities 420 may include hardware or a combination of hardware and software that may provide entities (e.g., signal lines, buses, etc.) that represent how data may be communicated between functional and/or non-functional units and blocks 430 of a model. Blocks 430 may include fundamental mathematical elements of a block diagram model.

Execution engine 440 may include hardware or a combination of hardware and software that may process a graphical model to produce simulation results, may convert the graphical model into executable code, and/or may perform other analyses and/or related tasks. In one implementation, for a block diagram graphical model, execution engine 440 may translate the block diagram into executable entities (e.g., units of execution) following the layout of the block diagram. The executable entities may be compiled and/or executed on a device (e.g., client device 210) to implement the functionality specified by the model.

Graphical models may include entities with relationships between the entities, and the relationships and/or the entities may have attributes associated with them. The entities my include model elements such as blocks 430 and ports. The relationships may include model elements such as lines (e.g., connector lines) and references. The attributes may include model elements such as value information and meta information for the model element associated with the attributes. Graphical models may be associated with configuration information. The configuration information may include information for the graphical model such as model execution information (e.g., numerical integration schemes, fundamental execution period, etc.), model diagnostic information (e.g., whether an algebraic loop should be considered an error or result in a warning), model optimization information (e.g., whether model elements should share memory during execution), model processing information (e.g., whether common functionality should be shared in code that is generated for a model), etc.

Additionally, or alternatively, a graphical model may have executable semantics and/or may be executable. An executable graphical model may be a time based block diagram. A time based block diagram may consist, for example, of blocks (e.g., blocks 430) connected by lines (e.g., connector lines). The blocks may consist of elemental dynamic systems such as a differential equation system (e.g., to specify continuous-time behavior), a difference equation system (e.g., to specify discrete-time behavior), an algebraic equation system (e.g., to specify constraints), a state transition system (e.g., to specify finite state machine behavior), an event based system (e.g., to specify discrete event behavior), etc. The lines may represent signals (e.g., to specify input/output relations between blocks or to specify execution dependencies between blocks), variables (e.g., to specify information shared between blocks), physical connections (e.g., to specify electrical wires, pipes with volume flow, rigid mechanical connections, etc.), etc. The attributes may consist of meta information such as sample times, dimensions, complexity (whether there is an imaginary component to a value), data type, etc. associated with the model elements.

In a time based block diagram, ports may be associated with blocks (e.g., blocks 430). A relationship between two ports may be created by connecting a line (e.g., a connector line) between the two ports. Lines may also, or alternatively, be connected to other lines, for example by creating branch points. For instance, three or more ports can be connected by connecting a line to each of the ports, and by connecting each of the lines to a common branch point for all of the lines. A common branch point for the lines that represent physical connections may be a dynamic system (e.g., by summing all variables of a certain type to 0 or by equating all variables of a certain type). A port may be an input port, an output port, an enable port, a trigger port, a function-call port, a publish port, a subscribe port, an exception port, an error port, a physics port, an entity flow port, a data flow port, a control flow port, etc.

Relationships between blocks (e.g., blocks 430) may be causal and/or non-causal. For example, a model may include a block that represents a continuous-time integration block that may be causally related to a data logging block by using a line (e.g., a connector line) to connect an output port of the continuous-time integration block to an input port of the data logging block. Further, during execution of the model, the value stored by the continuous-time integrator may change as the current time of the execution progresses. The value of the state of the continuous-time integrator may be available on the output port and the connection with the input port of the data logging block may make this value available to the data logging block.

A sample time may be associated with the elements of a graphical model. For example, a graphical model may include a block (e.g., block 430) with a continuous sample time such as a continuous-time integration block that may integrate an input value as time of execution progresses. This integration may be specified by a differential equation. During execution the continuous-time behavior may be approximated by a numerical integration scheme that is part of a numerical solver. The numerical solver may take discrete steps to advance the execution time, and these discrete steps may be constant during an execution (e.g., fixed step integration) or may be variable during an execution (e.g., variable-step integration).

Alternatively, or additionally, a graphical model may include a block (e.g., block 430) with a discrete sample time such as a unit delay block that may output values of a corresponding input after a specific delay. This delay may be a time interval and this interval may determine a sample time of the block. During execution, the unit delay block may be evaluated each time the execution time has reached a point in time where an output of the unit delay block may change. These points in time may be statically determined based on a scheduling analysis of the graphical model before starting execution.

Alternatively, or additionally, a graphical model may include a block (e.g., block 430) with an asynchronous sample time, such as a function-call generator block that may schedule a connected block to be evaluated at a non-periodic time. During execution, a function-call generator block may evaluate an input and when the input attains a specific value when the execution time has reached a point in time, the function-call generator block may schedule a connected block to be evaluated at this point in time and before advancing execution time.

Further, the values of attributes of a graphical model may be inferred from other elements of the graphical model or attributes of the graphical model. For example, the graphical model may include a block (e.g., block 430), such as a unit delay block, that may have an attribute that specifies a sample time of the block. When a graphical model has an execution attribute that specifies a fundamental execution period, the sample time of the unit delay block may be inferred from this fundamental execution period.

As another example, the graphical model may include two unit delay blocks (e.g., blocks 430) where the output of the first of the two unit delay blocks is connected to the input of the second of the two unit delay block. The sample time of the first unit delay block may be inferred from the sample time of the second unit delay block. This inference may be performed by propagation of model element attributes such that after evaluating the sample time attribute of the second unit delay block, a graph search proceeds by evaluating the sample time attribute of the first unit delay block since it is directly connected to the second unit delay block.

The values of attributes of a graphical model may be set to characteristics settings, such as one or more inherited settings, one or more default settings, etc. For example, the data type of a variable that is associated with a block (e.g., block 430) may be set to a default such as a double. Because of the default setting, an alternate data type (e.g., a single, an integer, a fixed point, etc.) may be inferred based on attributes of elements that the graphical model comprises (e.g., the data type of a variable associated with a connected block) and/or attributes of the graphical model. As another example, the sample time of a block may be set to be inherited. In case of an inherited sample time, a specific sample time may be inferred based on attributes of elements that the graphical model comprises and/or attributes of the graphical model (e.g., a fundamental execution period).

Although FIG. 4 shows example functional components of TCE 240, in other implementations, TCE 240 may include fewer functional components, different functional components, differently arranged functional components, and/or additional functional components than depicted in FIG. 4. Alternatively, or additionally, one or more functional components of TCE 240 may perform one or more other tasks described as being performed by one or more other functional components of TCE 240.

Example Technical Computing Environment Operations

Figure 5:
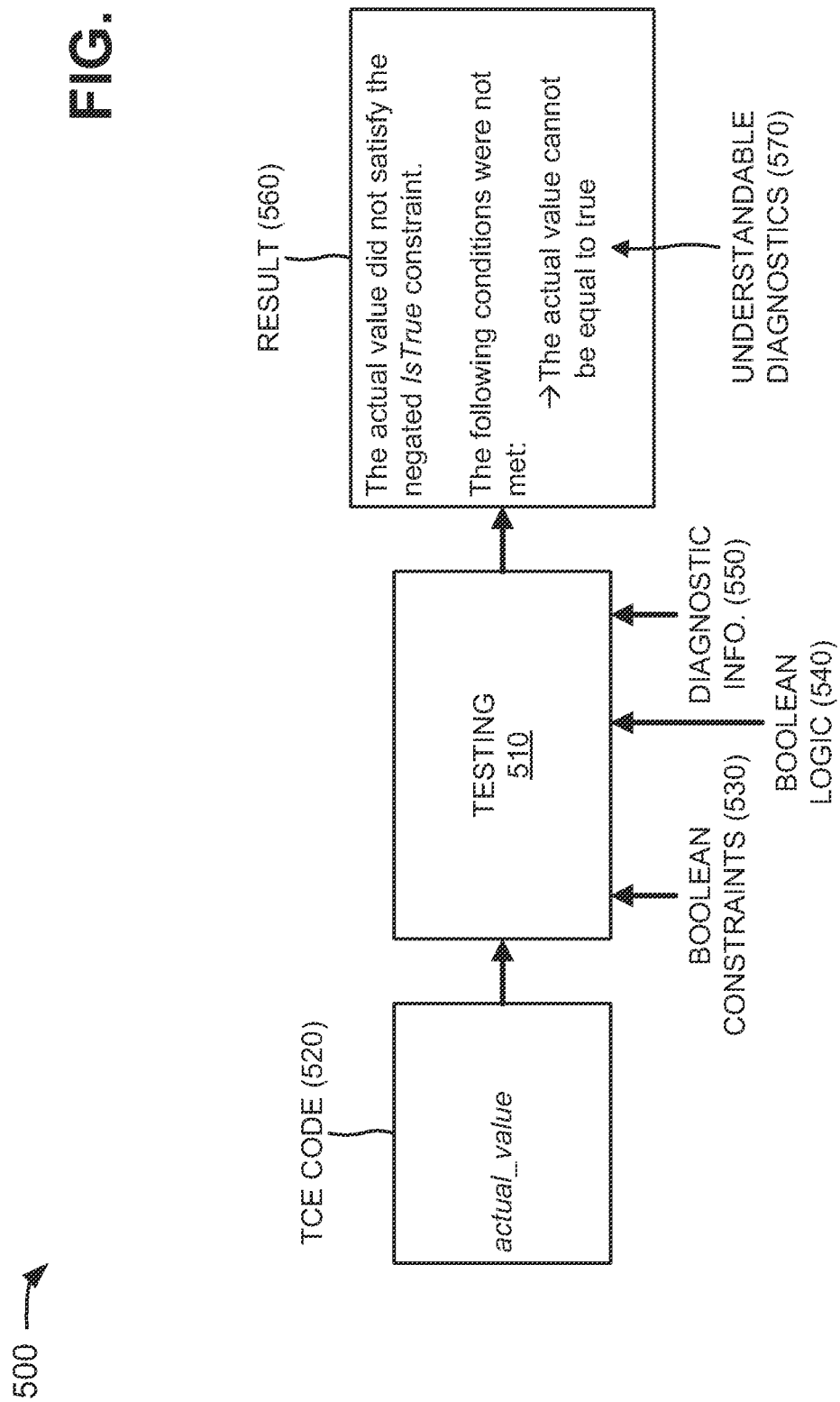
FIG. 5 is a diagram of example operations capable of being performed by the TCE.

FIG. 5 is a diagram of example operations 500 capable of being performed by TCE 240. TCE 240 may include the features described above in connection with, for example, one or more of FIGS. 1-4. As illustrated in FIG. 5, TCE 240 may include a testing component 510. The functions described in connection with testing component 510 may be performed by one or more components of device 300 (FIG. 3) and/or by one or more devices 300.

As further shown in FIG. 5, testing component 510 may receive code 520 generated by TCE 240. TCE code 520 may include text-based code that may require further processing to execute, binary code that may be executed, text files that may be executed in conjunction with other executables, etc. In one example, TCE code 520 may include one or more calculated values (e.g., actual_value) that may need to be tested by testing component 510.

Testing component 510 may receive Boolean constraints 530, Boolean logic 540, and/or diagnostic information 550 from a tester of TCE code 520. Each of Boolean constraints 530 may include a constraint with two possible outcomes (i.e., true or false). Boolean logic 540 may include Boolean operators (e.g., "and," "or," "not," etc.) that may enable Boolean constraints 530 to be combined to form Boolean expressions. For example, if Boolean constraints 530 include constraints C1, C2, and C3, the tester may utilize Boolean logic 540 to combine these constraints into a Boolean expression.

For example, the tester may specify that actual_value meets constraint C 1AND does not meet constraint C 2OR meets constraint C3. Testing component 510 may determine a result of the Boolean expression by analyzing scalar logical values returned by Boolean constraints 530. Diagnostic information 550 may include information explaining why Boolean constraints 530 and/or the Boolean expressions are or are not satisfied.

Testing component 510 may generate a test for TCE code 520 based on Boolean constraints 530, Boolean logic 540, and/or diagnostic information 550. In one example, testing component 510 may configure Boolean constraints 530 with Boolean logic 540 to generate one or more Boolean expressions. Testing component 510 may combine diagnostic information 550 with the Boolean expression(s) to create one or more test APIs, and may generate the test based on the test API(s). Testing component 510 may perform the test on TCE code 520 to generate a result 560. In one example, result 560 may include diagnostics that are understandable to the tester, as indicated by reference number 570, such as the following example diagnostics:

---
The actual value did not satisfy the negated IsTrue constraint.
The following conditions were not met:
    → The actual value cannot be equal to true.
---

Testing component 510 may output (e.g., display to the tester) and/or may store result 560. In one example implementation, result 560 may include the Boolean expression(s) of the test, diagnostics explaining why the Boolean expression(s) are or are not satisfied, etc.

In one example implementation, testing component 510 may provide, to the tester, a Boolean constraint interface that may produce diagnostic information. When a tester creates a constraint for testing TCE code 520, the tester (e.g., via testing component 510) may specify a method for the constraint (e.g., constraint.satisfiedBy(value)) and a method for diagnostics of the constraint (e.g., constraint.getDiagnosticFor (value)). Testing component 510 may utilize these methods to determine whether the constraint (e.g., satisfiedBy) is satisfied and to produce diagnostic information (e.g., provided by the getDiagnosticFor method) detailing how and why the constraint is or is not satisfied.

The Boolean constraint interface may enable the tester to utilize Boolean operators (e.g., and, or, not, etc.) with the Boolean constraints. In one example, the Boolean operators may be provided by syntax (e.g., AndConstraint, OrConstraint, NotConstraint, etc.) that operates on one or more constraints. Testing component 510 may call getDiagnosticFor methods of constraints on which the Boolean operators operate, and may present the Boolean operators in a natural manner (e.g., indenting to show AND/OR expression structure, etc.). This may allow the natural language of the Boolean operators to be preserved during diagnostic analysis. For example, an IsTrue constraint may include diagnostic verbiage such as:

---
The actual value did not satisfy the IsTrue constraint.
The following conditions were not met
    →The actual value must be of type "logical"
    →The actual value must be scalar.
    →The actual value must evaluate to true.
---

A negated version of the IsTrue constraint (e.g., ~IsTrue) may include diagnostic verbiage such as:

The actual value did not satisfy the negated IsTrue constraint.
The following conditions were not met
→The actual value cannot be equal to true.

Although FIG. 5 shows example operations capable of being performed by TCE 240, in other implementations, TCE 240 may perform fewer operations, different operations, and/or additional operations than depicted in FIG. 5. Alternatively, or additionally, one or more components of FIG. 5 may perform one or more other tasks described as being performed by one or more other components of FIG. 5.

Example Testing Component Operations

Figure 6:
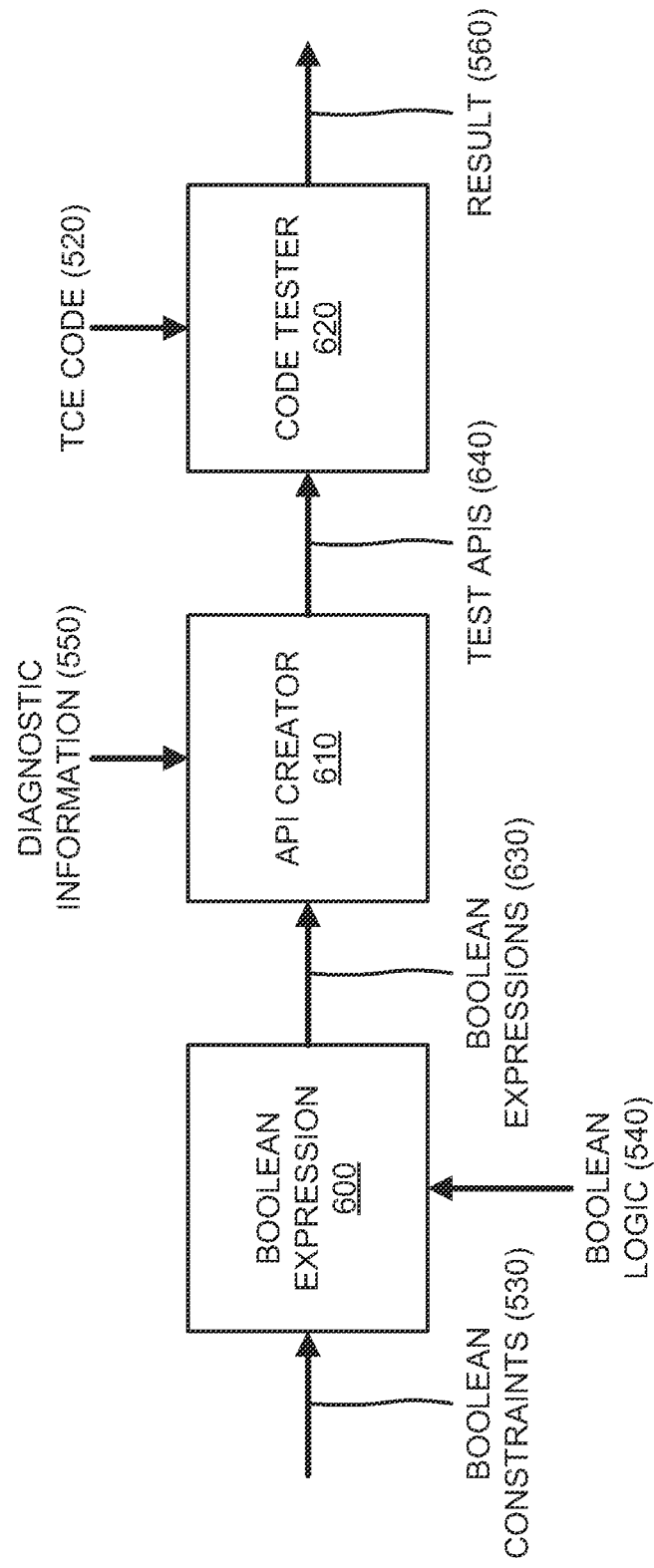
FIG. 6 is a diagram of example functional components of a testing component of the TCE.

FIG. 6 is a diagram of example functional components of testing component 510 (FIG. 5). The functions described in connection with testing component 510 may be performed by one or more components of device 300 (FIG. 3) and/or by one or more devices 300. As shown in FIG. 6, testing component 510 may include a Boolean expression component 600, an API creator component 610, and a code tester component 620.

Boolean expression component 600 may receive Boolean constraints 530 and Boolean logic 540, and may combine Boolean constraints 530 with Boolean logic 540 to create one or more Boolean expressions 630. Boolean expression 630 may include a single Boolean constraint 530, more than one Boolean constraint 530, and/or more than one Boolean constraint 530 combined with one or more Boolean logic 540. For example, to test a value (e.g., actual_value) of TCE code 520 for Boolean constraints 530 (e.g., greater than five and less than fifty or greater than one hundred), Boolean expression 630 (E) may take the form of:

$$E = (actual\_value > 5 \text{ AND } actual\_value < 50) \text{ OR } actual\_value > 100.$$

Boolean expression component 600 may provide Boolean expressions 630 to API creator component 610.

API creator component 610 may receive Boolean expressions 630 and diagnostic information 550, and may create one or more test APIs 640 based on Boolean expressions 630 and diagnostic information 550. For example, API creator component 610 may associate positive and negative diagnostic information 550 with a Boolean expression 630 to create a test API 640. The positive diagnostic information 550 may include information explaining why Boolean expression 630 is satisfied. The negative diagnostic information 550 may include information explaining why Boolean expression 630 is not satisfied. In one example implementation, the negative diagnostic information 550 may include language, to describe why Boolean expression 630 is not satisfied, that is different than language used by the positive diagnostic information 550 to describe why Boolean expression 630 is satisfied. Alternatively, or additionally, the positive and/or negative diagnostic information 550 may include the syntax associated with Boolean expression 630, which may aid a tester when TCE code 520 is tested and experiences a failure.

In one example implementation, Boolean constraints 530 may include a negated constraint (e.g., a value is not equal to ten) and a non-negated constraint (e.g., the value is equal to ten). When the value is not equal to ten, the non-negated constraint may fail and a negated version of the negated constraint (e.g., the value is not, not equal to ten) may also fail. In both situations, a satisfiedBy method may be used. However, the diagnostics for the two situations may be different so that the diagnostics may be provided to different methods and be in a proper language (e.g., English, Japanese, Chinese, etc.).

In one example, diagnostic information 550, associated with Boolean expressions 630, may include a more natural diagnostic language than typical diagnostic systems that utilize concatenated description strings. Unlike typical diagnostic systems, the concatenated description strings (e.g., provided by the natural diagnostic language) may be translated into other languages with different grammar semantics. This may result in a clearer understanding of causes of test failures of TCE code 520. Diagnostic information 550 may include structures of Boolean expressions 630, which may further aid in understanding causes of test failures of TCE code 520.

API creator component 610 may implement a getDiagnosticFor method (e.g., positive diagnostic information 550) and a getNegativeDiagnosticFor method (e.g., negative diagnostic information 550) for each Boolean expression 630. This may enable a tester to combine the getDiagnosticFor and getNegativeDiagnosticFor methods into many different logical expressions. When Boolean expression 630 is not satisfied, the getDiagnosticFor method may be implemented to invoke the getNegativeDiagnosticFor method. The getNegativeDiagnosticFor method may state that a negated constraint passes (e.g., is satisfied) when a non-negated constraint fails (e.g., is not satisfied), and may state that the negated constraint fails when the non-negated constraint passes. The getNegativeDiagnosticFor method may provide diagnostics stating that Boolean expression 630 incorrectly passes and reasons why Boolean expression 630 passes.

When Boolean expression 630 is satisfied, the getDiagnosticFor method may be invoked. If Boolean expression 630 is negated twice, the getNegativeDiagnosticFor method may be implemented to invoke the getDiagnosticFor since negating a negated constraint may bring Boolean expression 630 back to a normal non-negated constraint. If two Boolean constraints 530 are combined with an AND or an OR in Boolean expression 630, API creator component 610 may leverage diagnostic information 550 associated with the two Boolean constraints 530. As further shown in FIG. 6, API creator component 610 may provide test APIs 640 to code tester component 620.

Code tester component 620 may receive test APIs 640 and may generate a test based on test APIs 640. For example, code tester component 620 may combine one or more test APIs 640 together to create the test. As further shown in FIG. 6, code tester component 620 may receive TCE code 520, and may perform the test on TCE code 520 to generate result 560. Code tester component 620 may output (e.g., display) and/or store result 560.

Although FIG. 6 shows example functional components of testing component 510, in other implementations, testing component 510 may include fewer functional components, different functional components, differently arranged functional components, and/or additional functional components than depicted in FIG. 6. Alternatively, or additionally, one or more functional components of testing component 510 may perform one or more other tasks described as being performed by one or more other functional components of testing component 510.

Figure 7:
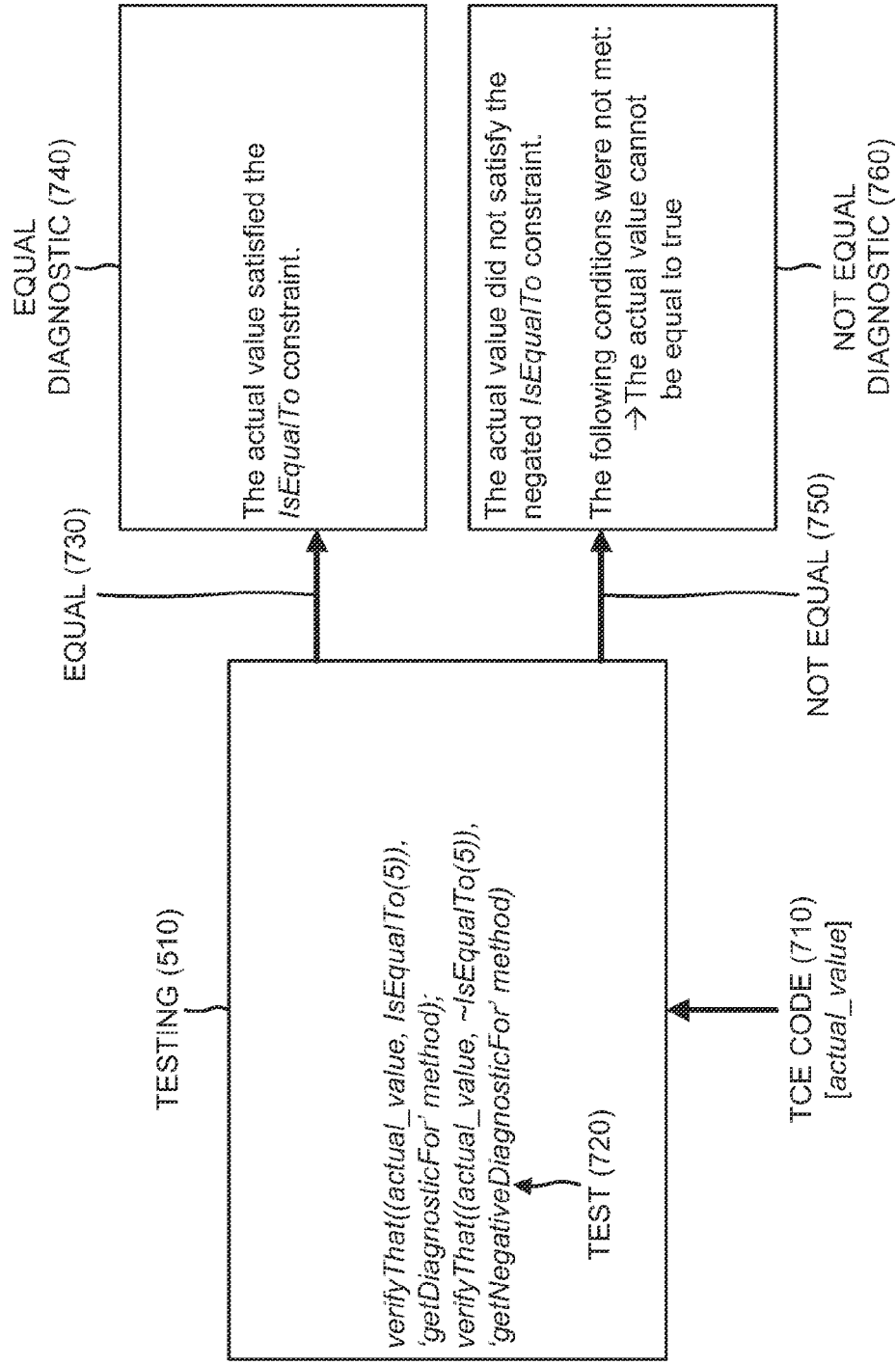
FIG. 7 is a diagram of example operations capable of being performed by the testing component.

FIG. 7 is a diagram of example operations 700 capable of being performed by testing component 510. Testing component 510 may include the features described above in connection with, for example, one or more of FIGS. 1, 5, and 6. As illustrated in FIG. 7, testing component 510 may receive code 710 generated by TCE 240. In one example, TCE code 710 may include a value (e.g., actual_value) that needs to be verified by testing component 510.

Prior to receiving TCE code 710, testing component 510 may receive Boolean constraints 530, Boolean logic 540, and/or diagnostic information 550 from a tester of TCE code 710. Testing component 510 may generate a test 720 for TCE code 710 based on Boolean constraints 530, Boolean logic 540, and/or diagnostic information 550. In one example, testing component 510 may configure Boolean constraints 530 with Boolean logic 540 to generate one or more Boolean expressions. Testing component 510 may combine diagnostic information 550 with the Boolean expression(s) to create one or more test APIs, and may generate test 720 based on the test API(s). In one example, test 720 may include the following syntax:

--- verifyThat((actual_value, IsEqualTo(5)), 'getDiagnosticFor' method);
verifyThat((actual_value, ~IsEqualTo(5)), 'getNegativeDiagnosticFor' method).

---

Test 720 may include a getDiagnosticFor method (e.g., positive diagnostic information 550) and a getNegativeDiagnosticFor method (e.g., negative diagnostic information 550) for a Boolean constraint (e.g., IsEqualTo).

Testing component 510 may perform test 720 on TCE code 710 to generate a result. When the IsEqualTo constraint is satisfied, the getDiagnosticFor method may be invoked by testing component 510. For example, as shown in FIG. 7, when the actual_value equals five, the IsEqualTo constraint may be satisfied, as indicated by reference number 730, and an equal diagnostic 740 may be output by testing component 510. Equal diagnostic 740 may include diagnostic information 550 provided by the getDiagnosticFor method, and the structure of the IsEqualTo constraint. For example, equal diagnostic 740 may include the following information:

The actual value satisfied the IsEqualTo constraint.

Alternatively, or additionally, when the actual_value does not equal five, the IsEqualTo constraint may not be satisfied and may produce diagnostic information describing why the actual_value does not equal the expected value (e.g., five). The IsEqualTo constraint may produce the diagnostic information when the getDiagnosticFor method is called for the IsEqualTo constraint. The diagnostic information provided by the getDiagnosticFor method may include the structure of the IsEqualTo constraint.

Alternatively, or additionally, if the IsEqualTo constraint is negated twice, the getDiagnosticFor method may be invoked by testing component 510. Alternatively, or additionally, when the~IsEqualTo constraint is satisfied, the getNegativeDiagnosticFor method may be invoked by testing component 510. For example, as shown in FIG. 7, when the actual_value does not equal five, the~IsEqualTo constraint may be satisfied, as indicated by reference number 750, and a not equal diagnostic 760 may be output by testing component 510. Not equal diagnostic 760 may include diagnostic information 550 provided by the getNegativeDiagnosticFor method, and the structure of the IsEqualTo constraint. For example, not equal diagnostic 760 may include the following information:

---

The actual value did not satisfy the negated IsEqualTo constraint.
The following conditions were not met:
→The actual value cannot be equal to true.

---

Alternatively, or additionally, when the actual_value equals five, the~IsEqualTo constraint may not be satisfied and may produce diagnostic information describing why the actual_value equals the expected value (e.g., five). The IsEqualTo constraint may produce the diagnostic information when the getDiagnosticFor method is called for the IsEqualTo constraint and the getDiagnosticFor method calls the getNegativeDiagnosticFor method. The diagnostic information provided by the getNegativeDiagnosticFor method may include the structure of the~IsEqualTo constraint.

Although FIG. 7 shows example operations capable of being performed by testing component 510, in other implementations, testing component 510 may perform fewer operations, different operations, and/or additional operations than depicted in FIG. 7. Alternatively, or additionally, one or more components of FIG. 7 may perform one or more other tasks described as being performed by one or more other components of FIG. 7.

Figure 8:
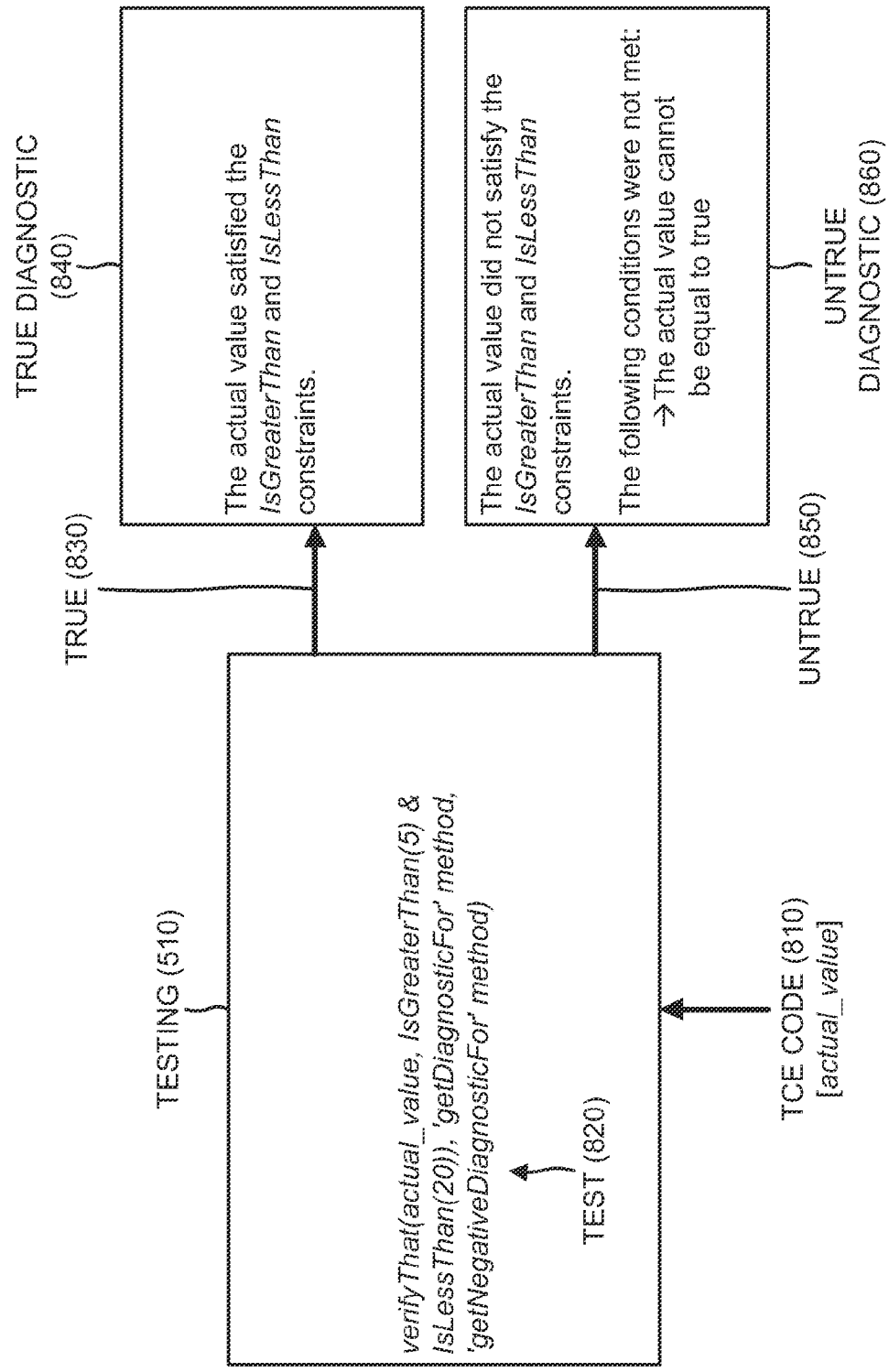
FIG. 8 is a diagram of further example operations capable of being performed by the testing component.

FIG. 8 is a diagram of further example operations 800 capable of being performed by testing component 510. Testing component 510 may include the features described above in connection with, for example, one or more of FIGS. 1 and 5-7. As shown in FIG. 8, testing component 510 may receive code 810 generated by TCE 240. In one example, TCE code 810 may include a value (e.g., actual_value) that needs to be verified by testing component 510.

Prior to receiving TCE code 810, testing component 510 may receive Boolean constraints 530, Boolean logic 540, and/or diagnostic information 550 from a tester of TCE code 810. Testing component 510 may generate a test 820 for TCE code 710 based on Boolean constraints 530, Boolean logic 540, and/or diagnostic information 550. In one example, testing component 510 may configure Boolean constraints 530 with Boolean logic 540 to generate one or more Boolean expressions. Testing component 510 may combine diagnostic information 550 with the Boolean expression(s) to create one or more test APIs, and may generate test 820 based on the test API(s). In one example, test 820 may include the following syntax:

--- verifyThat(actual_value, IsGreaterThan(5) & IsLessThan(20)),
'getDiagnosticFor' method, 'getNegativeDiagnosticFor' method).

---

Test 820 may include a getDiagnosticFor method (e.g., positive diagnostic information 550) and a getNegativeDiagnosticFor method (e.g., negative diagnostic information 550) for a constraint (e.g., verifyThat).

Testing component 510 may perform test 820 on TCE code 810 to generate a result. When the IsGreaterThan and IsLessThan constraints are satisfied, the getDiagnosticFor method may be invoked by testing component 510. For example, as shown in FIG. 8, when the actual_value is greater than five and less than twenty, the IsGreaterThan and IsLessThan constraints may be satisfied, as indicated by reference number 830, and a true diagnostic 840 may be output by testing component 510. True diagnostic 840 may include diagnostic information 550 provided by the getDiagnosticFor method, and the structure of the IsGreaterThan and IsLessThan constraints. For example, true diagnostic 840 may include the following information:

The actual value satisfied the IsGreaterThan and IsLessThan constraints.

Alternatively, or additionally, if the IsGreaterThan and IsLessThan constraints are negated twice, the getDiagnosticFor method may be invoked by testing component 510. Alternatively, or additionally, when the IsGreaterThan and IsLessThan constraints are not satisfied, the getNegativeDiagnosticFor method may be invoked by testing component

510. For example, as shown in FIG. 8, when the actual_value is less than five or greater than twenty, the IsGreaterThan and IsLessThan constraints may not be satisfied, as indicated by reference number 850, and an untrue diagnostic 860 may be output by testing component 510. Untrue diagnostic 860 may include diagnostic information 550 provided by the getNegativeDiagnosticFor method, and the structure of the IsGreaterThan and IsLessThan constraints. For example, untrue diagnostic 860 may include the following information:

---
The actual value did not satisfy the IsGreaterThan and IsLessThan constraints.
  The following conditions were not met:
    →The actual value cannot be equal to true.

---

In one example implementation, test 820 may check the actual_value to determine whether the actual_value satisfies the syntax: AndConstraint(IsGreaterThan(5), IsLessThan(20)). Testing component 510 may compare the actual_value against the AndConstraint, which may dispatch to the two constraints that are joined together with an AND expression. If a negation is added, the syntax may include: verifyThat (actual_value, IsGreaterThan(5) & ~IsInf). In such a situation, the resulting constraint may include the syntax: AndConstraint(IsGreaterThan(5), NotConstraint(IsInf)).

Although FIG. 8 shows example operations capable of being performed by testing component 510, in other implementations, testing component 510 may perform fewer operations, different operations, and/or additional operations than depicted in FIG. 8. Alternatively, or additionally, one or more components of FIG. 8 may perform one or more other tasks described as being performed by one or more other components of FIG. 8.

Example Process

Figure 9:
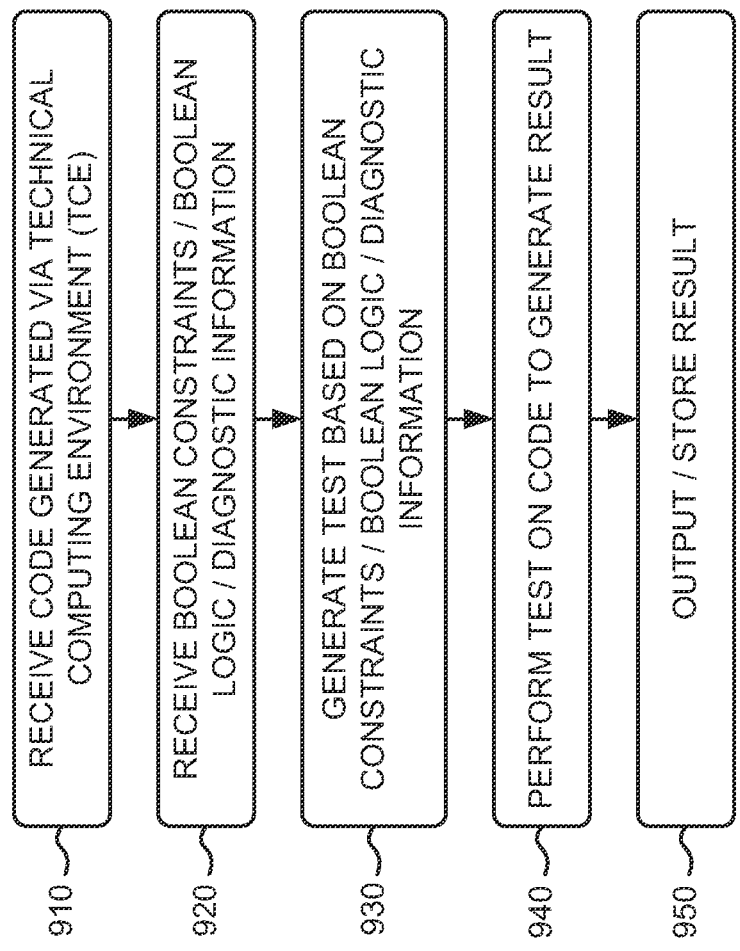
FIGS. 9 and 10 are flow charts of an example process for integrating meaningful diagnostic information with a rich set of Boolean constraints.
Figure 10:
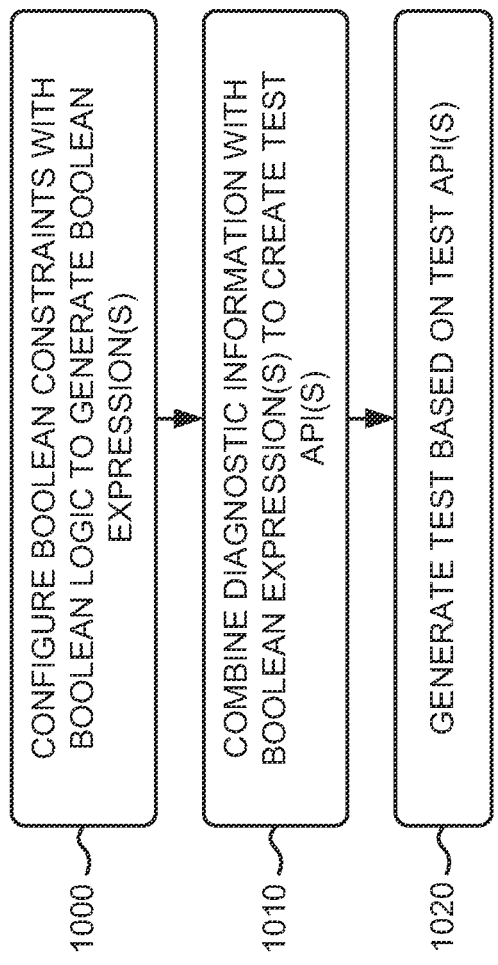

FIGS. 9 and 10 are flow charts of an example process 900 for integrating meaningful diagnostic information with a rich set of Boolean constraints. In one implementation, process 900 may be performed by client device 210/TCE 240. Alternatively, or additionally, process 900 may be performed by another device or a group of devices separate from or including client device 210/TCE 240.

As shown in FIG. 9, process 900 may include receiving code generated via a technical computing environment (TCE) (block 910), and receiving Boolean constraints, Boolean logic, and/or diagnostic information (block 920). For example, in an implementation described above in connection with FIG. 5, testing component 510 may receive code 520 generated by TCE 240. TCE code 520 may include text-based code that may require further processing to execute, binary code that may be executed, text files that may be executed in conjunction with other executables, etc. Testing component 510 may receive Boolean constraints 530, Boolean logic 540, and/or diagnostic information 550 from a tester of TCE code 520. Each of Boolean constraints 530 may include a constraint with two possible outcomes (i.e., true or false). Boolean logic 540 may include Boolean operators (e.g., "and," "or," "not," etc.) that may enable Boolean constraints 530 to be combined to form Boolean expressions. Diagnostic information 550 may include information explaining why Boolean constraints 530 and/or the Boolean expressions are or are not satisfied.

As further shown in FIG. 9, process 900 may include generating a test based on the Boolean constraints, the Boolean logic, and/or the diagnostic information (block 930), performing the test on the code to generate a result (block 940), and outputting and/or storing the result (block 950). For example, in an implementation described above in connection with FIG. 5, testing component 510 may generate a test for TCE code 520 based on Boolean constraints 530, Boolean logic 540, and/or diagnostic information 550. Testing component 510 may perform the test on TCE code 520 to generate result 560. In one example, result 560 may include diagnostics that are understandable to the tester, as indicated by reference number 570. Testing component 510 may output (e.g., display to the tester) and/or may store result 560. In one example implementation, result 560 may include the Boolean expression(s) of the test, diagnostics explaining why the Boolean expression(s) are or are not satisfied, etc.

Process block 930 may include the process blocks depicted in FIG. 10. As shown in FIG. 10, process block 930 may include configuring the Boolean constraints with the Boolean logic to generate Boolean expression(s) (block 1000), combining the diagnostic information with the Boolean expression(s) to create test API(s) (block 1010), and generating the test based on the test API(s) (block 1020). For example, in an implementation described above in connection with FIG. 5, testing component 510 may configure Boolean constraints 530 with Boolean logic 540 to generate one or more Boolean expressions. Testing component 510 may combine diagnostic information 550 with the Boolean expression(s) to create one or more test APIs, and may generate the test based on the test API(s).

Conclusion

Systems and/or methods described herein may integrate meaningful diagnostic information with a rich set of Boolean constraints. In one example, the systems and/or methods may generate a qualification API that provides a set of constraints for determining whether a calculated value, in code, passes tests for ensuring correctness. The constraints may be used to determine whether or not the calculated value satisfies conditions (e.g., is less than a number, is greater than a number, etc.), and to provide meaningful diagnostic information that explains why the calculated value does or does not satisfy the conditions. The systems and/or methods may enable the constraints to be combined in Boolean logic expressions, and may enable the combination of constraints to produce meaningful diagnostic information. The meaningful diagnostic information may include the structure of the Boolean logic expressions, language for when the constraints are satisfied, language for when the constraints are not satisfied, etc.

The foregoing description of implementations provides illustration and description, but is not intended to be exhaustive or to limit the implementations to the precise form disclosed. Modifications and variations are possible in light of the above teachings or may be acquired from practice of the implementations.

For example, while series of blocks have been described with regard to FIGS. 9 and 10, the order of the blocks may be modified in other implementations. Further, non-dependent blocks may be performed in parallel.

It will be apparent that example aspects, as described above, may be implemented in many different forms of software, firmware, and hardware in the implementations illustrated in the figures. The actual software code or specialized control hardware used to implement these aspects should not be construed as limiting. Thus, the operation and behavior of the aspects were described without reference to the specific software code—it being understood that software and control hardware could be designed to implement the aspects based on the description herein.

Further, certain portions of the implementations may be implemented as a "component" that performs one or more functions. This component may include hardware, such as a processor, an application-specific integrated circuit (ASIC), or a field-programmable gate array (FPGA), or a combination of hardware and software.

Even though particular combinations of features are recited in the claims and/or disclosed in the specification, these combinations are not intended to limit the disclosure of the specification. In fact, many of these features may be combined in ways not specifically recited in the claims and/or disclosed in the specification. Although each dependent claim listed below may directly depend on only one other claim, the disclosure of the specification includes each dependent claim in combination with every other claim in the claim set.

No element, act, or instruction used in the present application should be construed as critical or essential unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

What is claimed is:

1. A device comprising:
one or more processors to:
receive code generated via a technical computing environment (TCE),
the code including one or more values to be tested,
receive Boolean constraints and diagnostic information,
configure the Boolean constraints with Boolean logic to generate one or more Boolean expressions,
the Boolean logic including one or more Boolean operators that enable the Boolean constraints to be combined to form the one or more Boolean expressions,
associate the diagnostic information with the one or more Boolean expressions to create one or more test application programming interfaces,
generate a test based on the one or more test application programming interfaces,
perform the test on the one or more values of the code to generate a result, and
output or store the result,
the result including information that identifies why the one or more values of the code satisfy or do not satisfy the Boolean constraints.

2. The device of claim 1, where each of the Boolean constraints includes a constraint with two possible outcomes.

3. The device of claim 1, where the diagnostic information includes information explaining why the Boolean constraints or the one or more Boolean expressions are or are not satisfied.

4. The device of claim 1, where the diagnostic information includes structures of the Boolean constraints or the one or more Boolean expressions.

5. The device of claim 1, where the result includes information explaining why the one or more values of the code satisfy or do not satisfy the one or more Boolean expressions.

6. The device of claim 1, where the Boolean constraints include at least one of:
an equal to constraint,
a less than constraint, or
a greater than constraint.

7. The device of claim 1, where the one or more test application programming interfaces include a plurality of test application programming interfaces, and
where the one or more processors, when generating the test, are further to:
generate the test based on a combination of the plurality of test application programming interfaces.

8. The device of claim 1, where the diagnostic information includes concatenated description strings.

9. A method, comprising: receiving code generated via a technical computing environment (TCE),
the code including one or more values to be tested,
the receiving the code being performed by one or more devices;
receiving Boolean constraints, Boolean logic, and diagnostic information,
the Boolean logic including one or more Boolean operators that enable the Boolean constraints to be combined to form Boolean expressions,
the receiving the Boolean constraints, the Boolean logic, and the diagnostic being performed by the one or more devices;
configuring the Boolean constraints with the Boolean logic to generate one or more Boolean expressions,
the configuring being performed by the one or more devices;
associating the diagnostic information with the one or more Boolean expressions to create one or more test application programming interfaces,
the associating being performed by the one or more devices;
generating a test based on the one or more test application programming interfaces,
the generating being performed by the one or more devices;
performing the test on the one or more values of the code to generate a result,
the performing the test being performed by the one or more devices; and
outputting or storing the result,
the result including information that explains why the one or more values of the code satisfy or do not satisfy the Boolean constraints,
the outputting or the storing being performed by the one or more devices.

10. The method of claim 9, where each of the Boolean constraints includes a constraint with two possible outcomes.

11. The method of claim 9, where the diagnostic information includes information explaining why the Boolean constraints or the Boolean expressions are or are not satisfied.

12. The method of claim 9, where the diagnostic information includes structures of the Boolean constraints or the Boolean expressions.

13. The method of claim 9, where the result includes information explaining why the one or more values of the code satisfy or do not satisfy the one or more Boolean expressions.

14. The method of claim 9, where the Boolean constraints include at least one of:
an equal to constraint,
a less than constraint, or
a greater than constraint.

15. The method of claim 9, where the one or more test application programming interfaces include a plurality of test application programming interfaces, and
where generating the test further comprises:
generating the test based on a combination of the plurality of test application programming interfaces.

16. The method of claim 9, where the diagnostic information includes concatenated description strings.

17. One or more non-transitory computer-readable media, comprising:
one or more instructions that, when executed by a processor of a device, cause the processor to:
receive code generated via a technical computing environment (TCE), the code including one or more values to be tested,
receive Boolean constraints, Boolean logic, and diagnostic information,
the Boolean logic including one or more Boolean operators that enable the Boolean constraints to be combined to form Boolean expressions,
configure the Boolean constraints with the Boolean logic to generate one or more Boolean expressions,
associate the diagnostic information with the one or more Boolean expressions to create one or more test application programming interfaces,
generate a test based on the one or more test application programming interfaces,
perform the test on the one or more values of the code to generate a result, and
output or store the result,
the result including information that identifies why the one or more values of the code satisfy or do not satisfy the Boolean constraints.

18. The non-transitory computer-readable media of claim 17, where each of the Boolean constraints includes a constraint with two possible outcomes.

19. The non-transitory computer-readable media of claim 17, where the diagnostic information includes structures of the Boolean constraints or the Boolean expressions.

20. The non-transitory computer-readable media of claim 17, where:
a particular Boolean constraint, of the Boolean constraints, includes a non-negated constraint and a negated constraint, and
the result includes one of:
first information describing why the non-negated constraint fails, or
second information describing why the negated constraint fails, the second information being different than the first information.

21. The non-transitory computer-readable media of claim 20, where the first information and the second information are capable of being translated into multiple languages with different grammar semantics.

22. The non-transitory computer-readable media of claim 17, where the Boolean constraints include at least one of:
an equal to constraint,
a less than constraint, or
a greater than constraint.

23. The non-transitory computer-readable media of claim 17, where the one or more test application programming interfaces include a plurality of test application programming interfaces, and
where the one or more instructions, that cause the processor to generate the test, further cause the processor to:
generate the test based on a combination of the plurality of test application programming interfaces.

24. The non-transitory computer-readable media of claim 17, where the diagnostic information includes concatenated description strings.

* * * * *